United States Patent [19]

Espelage et al.

[11] Patent Number: 4,565,953
[45] Date of Patent: Jan. 21, 1986

[54] TWELVE PULSE AC MOTOR DRIVE

[75] Inventors: Paul M. Espelage, Salem; James M. Nowak, Roanoke, both of Va.

[73] Assignee: General Electric Company, Salem, Va.

[21] Appl. No.: 626,982

[22] Filed: Jul. 2, 1984

[51] Int. Cl.[4] .............................................. H02P 5/16
[52] U.S. Cl. ................................. 318/345 E; 318/341; 318/809; 363/71
[58] Field of Search .......... 363/71; 318/803, 807–811, 318/345 E, 341

[56] References Cited

U.S. PATENT DOCUMENTS

| | | | |
|---|---|---|---|
| 4,090,116 | 5/1978 | Lippitt | 318/345 E |
| 4,267,570 | 5/1981 | Braun | 363/138 |
| 4,364,434 | 8/1982 | Morinaga | 318/345 E |
| 4,399,395 | 8/1983 | Espelage | 318/803 |
| 4,419,615 | 12/1983 | Muto et al. | 318/811 |
| 4,426,611 | 1/1984 | Espelage et al. | 318/803 |
| 4,427,933 | 1/1984 | Wagener et al. | 318/345 E |
| 4,449,087 | 5/1984 | Lippitt et al. | 318/723 |

Primary Examiner—David Smith, Jr.
Attorney, Agent, or Firm—Arnold F. Renner

[57] ABSTRACT

A single microcomputer controls the firing time determination for two independent current regulators for two six pulse AC/DC converters which are part of a twelve pulse parallel controlled current inverter (CCI) AC motor drive. A very short high priority interrupt occurs when a motor channel source converter thyristor fires. This interrupt calls a longer, low priority current regulator interrupt informing it that a master channel source converter thyristor has just been fired. The current regulator causes a count to be loaded into a master fire counter and also loads a firing mask into a hardware latch or buffer. When the master fire counter times out the next thyristor pair of the master channel source converter is fired directly out of hardware. Similarly, there is a separate slave channel fire counter loaded after the current regulator is called by a short high priority interrupt when a thyristor in the slave channel source converter fires.

10 Claims, 9 Drawing Figures

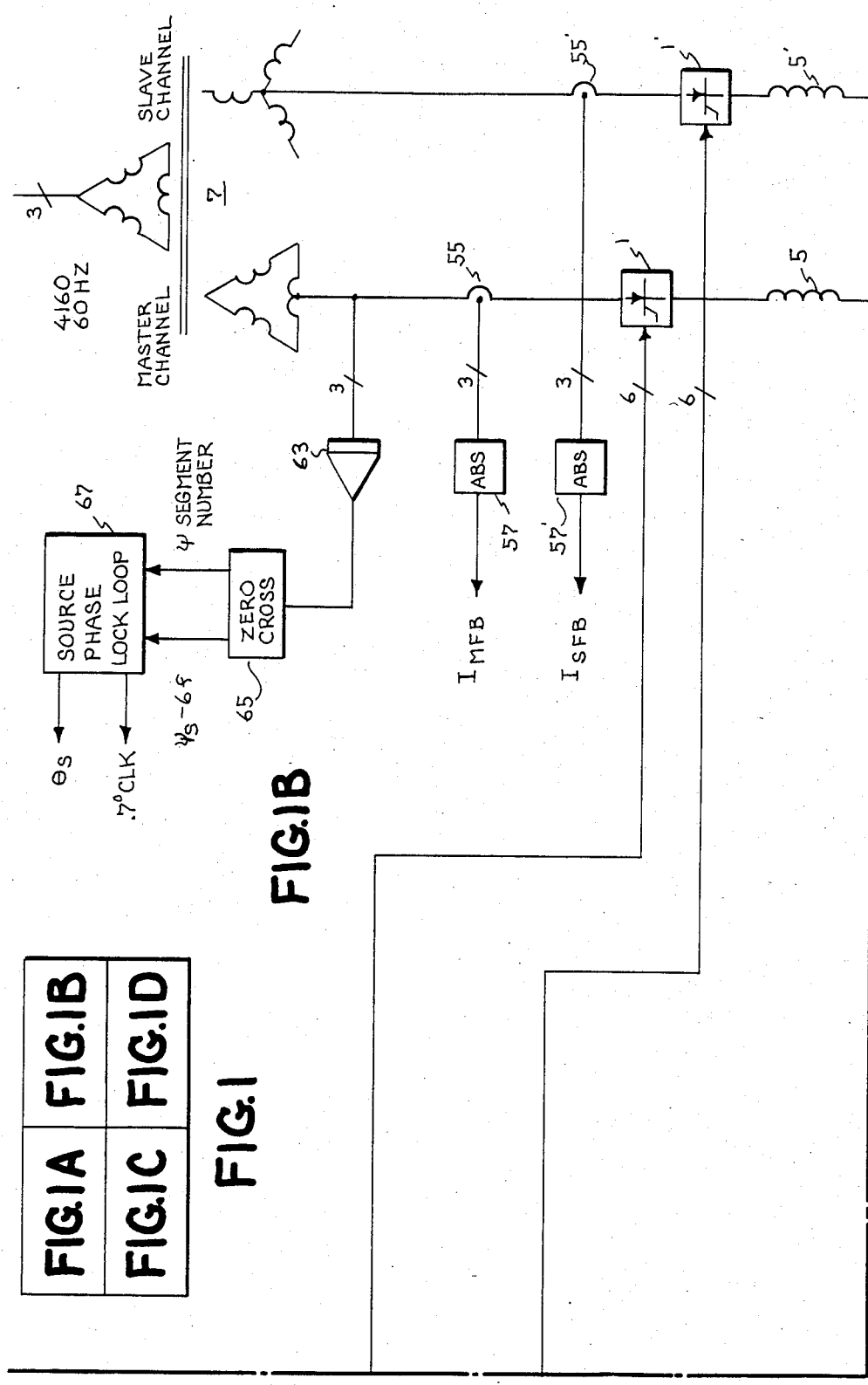

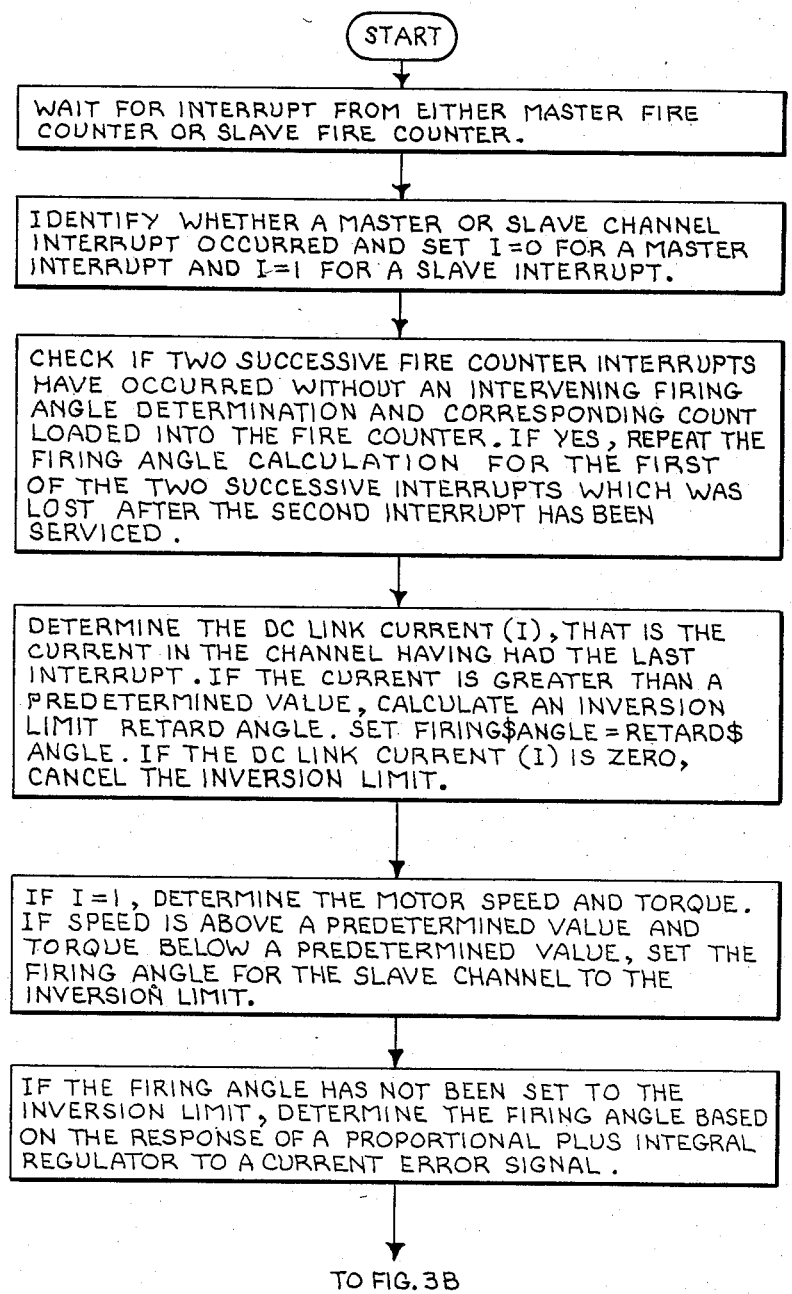

TWELVE PULSE AC MOTOR DRIVE

REFERENCED MATERIAL

Reference is made to a microfiche appendix which sets forth a computer program listing of the software modules which have been modified in the program listing provided in the microfiche appendix of D. Lippitt et al U.S. Pat. No. 4,449,087. Included with this application is one microfiche containing a total of 29 frames. U.S. Pat. No. 4,449,087 is assigned to the same assignee as the instant application and is hereby incorporated by reference.

CROSS REFERENCE TO RELATED APPLICATIONS

This application is related to allowed application Ser. No. 626,999, "Phase-Locked Loop Control of an Induction Motor Drive" and allowed application Ser. No. 627,000, "Start-up Control for an Induction Motor Drive" filed on even date herewith and assigned to the instant assignee.

BACKGROUND OF THE INVENTION

The present invention relates to a control for independent parallel AC to DC converters supplying a DC load or the use of two current controlled inverters connected to an AC motor.

Paralleling two current controlled inverters, each inverter being supplied by its own phase controlled rectifier, to supply an AC machine has the advantages of reducing current harmonics, torque pulsations and eddy current losses. Each of the parallel inverters needs only half the power rating of the machine being supplied, reducing the size of the commutating capacitors and the ratings of the controllable switching devices of the inverter. A three phase inverter has a six pulse torque ripple with the currents having an approximately 120° duration and rectangular shape. Two parallel inverters provide a twelve pulse ripple since there is a 30° phase shift introduced by advancing the firing of one inverter relative to the other. The currents provided by the parallel inverter is more sinusoidal in shape than the six step current wave.

A microcomputer control of a twelve pulse inverter simplifies the implementation of the firing controls of the inverter by eliminating analog squaring, square root, divider and multiplier circuits. It is desirable to use a single microcomputer to control the independent parallel AC to DC converters supplying the parallel inverters to reduce costs and reduce the communication complexity that multiple micro processors can introduce.

During normal steady state operation the source converter of one parallel channel is fired 30 electrical degrees after the other parallel channel. However, when one channel is to be shut down or its current brought to zero while the other channel maintains operation, a problem can arise if a single microcomputer is used to alternately perform the firing angle calculation and firing for the independent parallel AC to DC converters supplying both channels. Since the AC to DC converter of both channels will sometimes need to be fired at time intervals requiring simultaneous execution of the firing angle regulation and firing this can lead to possible transient loss of control.

It is a object of the present invention to provide a single microcomputer control for the firing angle determination of two independent parallel source converters in a 12 pulse AC motor drive.

It is a further object of the present invention to provide a control using a single microcomputer for the firing angle determination of both parallel source converters in a 12 pulse AC motor drive without creating severe restriction on the execution time of the firing angle regulators.

It is a still further object of the present invention to allow completely arbitrary firing angles for two parallel AC to DC converters supplying a load without any interference in the current regulator programs for each of the converters run by a single microcomputer.

SUMMARY OF THE INVENTION

In one aspect of the present invention a control for independent parallel AC to DC converters coupled to a DC load is provided. The control provides first and second fire counter means for receiving the time to fire the next controlled switch of the first and second AC to DC converters respectively. A first latch means is responsive to the first fire counter's timing out for firing the next controlled switch in the first AC to DC converter. A second latch means responsive to the second fire counter means timing out, fires the next controllable switch in the second AC to DC converter. A first interrupt signal is generated responsive to the firing of the first AC to DC converter and a second interrupt signal is generated responsive to the firing of the second AC to DC converter. Current regulator means comprising a single microcomputer is responsive to the first interrupt signal for determining and loading the time to go to fire the next controllable switch into the first fire counter means. The current regulator means is also responsive to the second interrupt signal for determining and loading the time to go to fire the next controllable switch, into the second firing counter means.

In another aspect of the present invention a method of controlling independent parallel AC to DC converters supplying parallel controlled current inverters which in turn supply an AC motor is provided. The method comprises the steps of generating a first interrupt signal when a controllable switch in the first of the parallel AC to DC converters is fired. Next, determining in a microcomputer, responsive to the first interrupt signal the time to be loaded into a first fire counter for firing the next controllable switch in the first AC to DC converter. Loading a first fire counter with the time determined for the firing the first AC to DC converter in the microcomputer. Generating a second interrupt signal when a controllable switch in the second of the parallel AC to DC converters is fired. Then, determining in the same microcomputer, responsive to the second interrupt signal, the time to be loaded into a second fire counter for firing the next controllable switch in the second AC to DC converter. Loading a second fire counter with the time determined for firing the second AC to DC converter in the microcomputer. Firing the next controllable switch in the first AC to DC converter, independent from the microcomputer, when the first fire counter times out. Firing the next controllable switch in the second AC to DC converter, independent of the microcomputer, when the second fire counter times out.

BRIEF DESCRIPTION OF THE DRAWING

The features of the invention believed to be novel are set forth with particularity in the appended claims. The invention itself, both as to organization and method of operation, together with further objects and advantages thereof, may best be understood by reference to the following description taken in conjunction with the accompanying drawing in which:

FIGS. 1A-D constitute a major block diagram representation of a 12 pulse parallel converter drive system incorporating the present invention;

DETAILED DESCRIPTION OF THE INVENTION

Figure 1A:
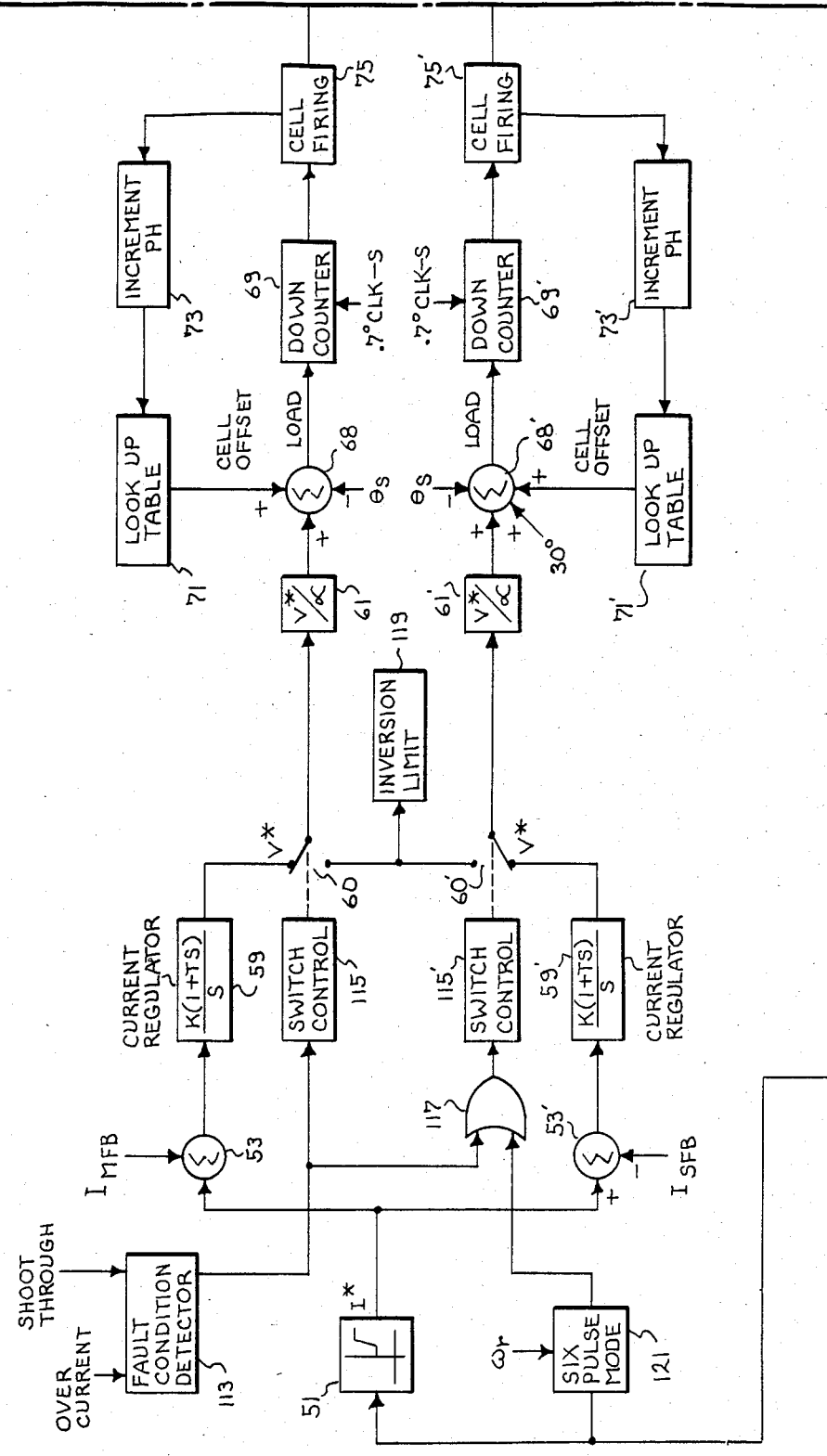
Figure 1C:
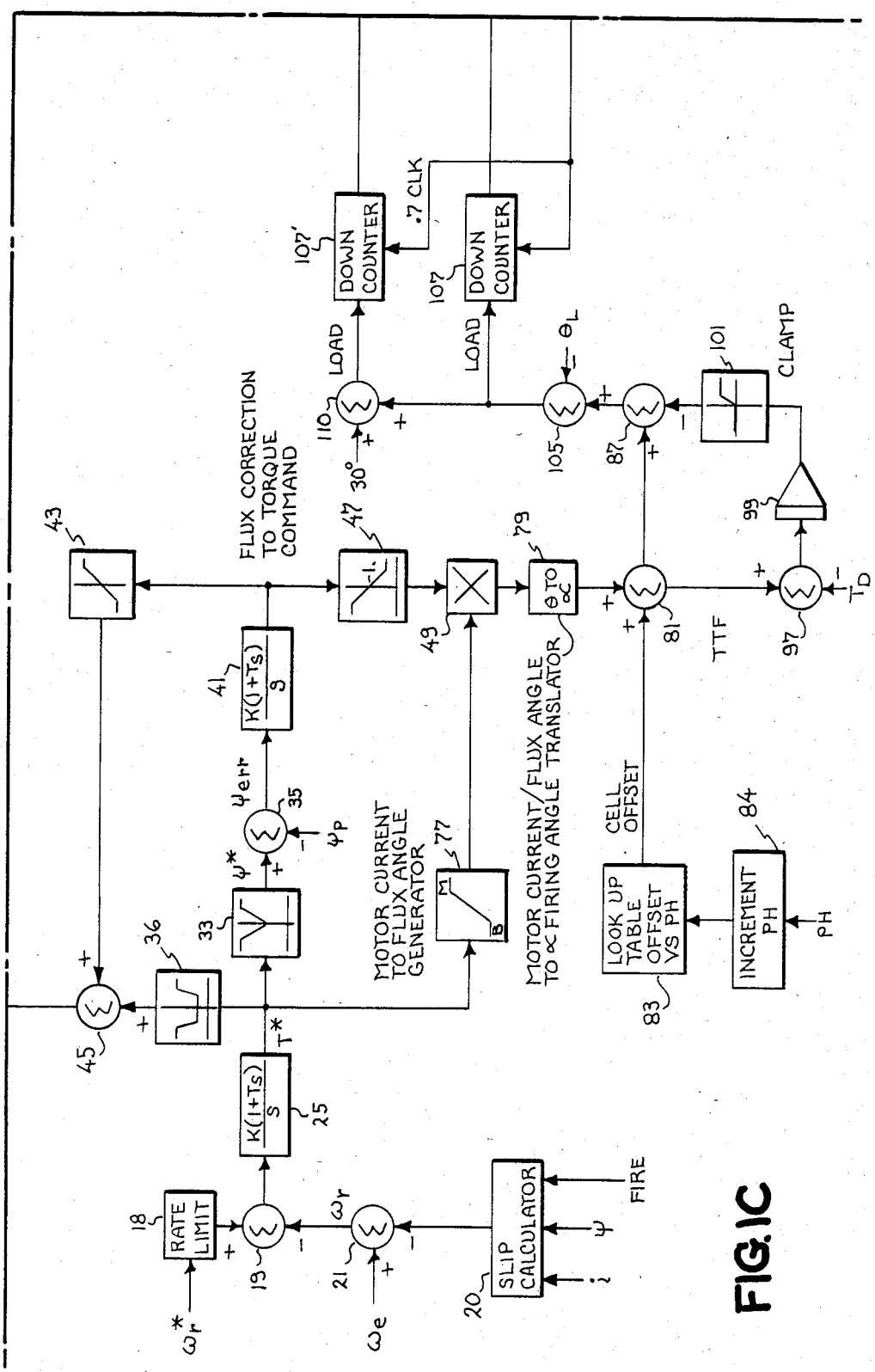

Referring now to the drawing and particularly FIGS. 1A-D thereof, an induction motor drive system including two parallel converters is shown. The first parallel converter comprises a source side converter which in the present embodiment is a phase controlled rectifier 1 and a load side converter which in the present embodiment is current controlled autosequentially commutated inverter 2. The phase controlled rectifier provides variable magnitude direct current to the inverter 2 through a DC-link reactor 5. The first parallel converter is also referred to in the present application as the master channel. The second parallel converter referred to as the slave channel comprises corresponding elements to the master channel, a phase controlled rectifier 1' and an autosequentially commutated inverter 2' coupled together by a DC-link reactor 5'. A three phase transformer 7 having a delta connected primary, a delta connected secondary and a wye connected secondary supplies external three phase power source to the master and slave channels, respectively. The inverters 2,2' operate to provide 12 pulse 6 phase power to an induction motor 9 through a three phase transformer 11 having a wye connected and a delta connected primaries and a delta connected secondary. The wye connected primary is coupled to the output of the master channel inverter 2 and the delta connected primary is coupled to the slave channel inverter 2'.

A commanded speed $\omega_r^*$ is an input signal to the AC motor drive control and is supplied to a rate limiting block 18 and the output of the rate limiting block is compared to a speed feedback signal $\omega_r$ in summer 19. The speed feedback signal $\omega_r$ is developed by calculating the slip in a slip calculator 20 from motor current, flux and firing angle from the master channel, and subtracting the slip in summing junction 21 from the frequency $\omega_e$ of the power supplied to the induction machine 9. The error signal from summing junction 19 is supplied to a speed regulator circuit 25 having a transfer function of $K(1+TS)/S$ where S is the LaPlace operator. The output of the speed regulator block is a torque command $T^*$. The torque command is fed to three control paths. An upper path controls the current in the two phase controlled rectifiers 1, 1'.

A center control path controls flux in the induction motor 9 by controlling the firing of the switching devices in inverters 2,2'. The center path provides flux correction to the torque command $T^*$ provided to the upper and lower paths. Function block 33 converts the torque reference signal $T^*$ to a flux command $\Psi^*$. The function implemented in function block 33 provides an offset to assure a fixed level of flux at zero torque. The flux command is compared in summing junction 35 to a flux feedback signal $\Psi_p$, determined by integrating the output voltage of inverter 2 in integrator 37 and passing the signal through a peak detector 38, to form a flux error signal $\Psi_{err}$, which is fed through a gain block 41 to a limiter 43. The output of the limiter is supplied to a summing junction 45 along with the magnitude of the torque command $T^*$, the output from function block 36. The output of limiter 43 adjusts the current command when the flux is different from the commanded value, to convert the upper current control path to a flux regulator when torque and commanded torque are both near zero.

The signal from gain block 41 is also supplied to an offset function in block 47. The output signal block 47 is coupled to a multiplier 49 in the lower control path. Offset function 47 generates an output of unity when the flux error signal is zero. The output of the offset function 47 decreases below unity when the commanded flux is greater than the actual flux to decrease the angle between motor current and flux to divert more of the available current into the flux producing axis.

The flux corrected current signal from summing junction 45 is supplied to a function block 51 which provides a current command $I^*$ which is compared to a current feedback signal $I_{MFB}$ in summing junction 53. The current feedback signal is obtained from current sensors 55 in each of the three lines supplying the phase controlled rectifier 1 in the master channel. Absolute value block 57 receives the three sensed line currents and provides the current feedback signal $I_{MFB}$ indicative of the magnitude of the three signals.

Current regulator 59, which can be a propertional plus integral regulator, in response to the current error from summing junction 53, provides a voltage command signal $V^*$. A voltage to firing angle translator 61, which can be implemented as a look-up table, provides a firing angle command $\alpha^*$ in response to the voltage command $V^*$ received through a switch 60.

The firing circuit, including the phase-locked loop integrator, zero crossing detector, cell firing block and down counter for the phase controlled thyristor bridge is the same as set-forth in Lippitt et al U.S. Pat. No. 4,449,087. The three phase line to line voltages supplied to the phase controlled thyristor bridge are integrated in integrator 63 and the zero crossings of the integrated voltages are determined in block 65 and used to form a synchronizing pulse train to the phase-locked loop 67 having a frequency of 6 times the line frequency. A preferred form of apparatus utilizable for implementing the integration of the line to line voltages comprises circuitry shown and described in U.S. Pat. No. 4,399,395 issued Aug. 6, 1983, entitled "Line-to-Line Voltage Reconstruction for Synchronizing Thyristor Power Converter". U.S. Pat. No. 4,399,395 is hereby incorporated by reference. Such circuitry operates to reconstruct the line to line voltage waveforms which become corrupted by the commutation notches appearing in the waveforms of the phase voltages during the time each phase current transfers from an outgoing phase to an oncoming phase by the appropriate firing of the individual thyristors. The line to line voltage reconstruction preferred by the subject invention consists of a composite waveform developed by summing at least one integrated line to line voltage containing commutation notches with a signal corresponding to at least one "delta" current which is derived from the difference of two phase currents and multiplied by a factor representative of the commutation inductance.

At the occurrence of a zero crossing signal, a time counter in the phase-locked loop 67 is read.

The correct time counter reading at this instant is known, and the difference between the actual and correct values represents a phase error which passes through a software proportional plus integral regulator. The output of the regulator represents the value by which the high frequency clock to the phase-locked loop counter is divided so as to provide a clock frequency from the phase-locked loop counter of 512 times the fundamental frequency of the line to line voltage supplied to the phase controlled thyristor bridge 1. The frequency of 512 times the fundamental frequency provides an angle resolution of 0.703° of fundamental frequency and serves as the clock frequency to the down counter 69. The commanded firing angle $\alpha^*$ is added to a cell offset from a look-up table 71. The table look-up provides one of six offsets based on the variable PH which is indicative of the next cell pair to be fired. The variable PH is incremented each time a cell is fired.

The term cell is used in this application to refer to the controllable switches in the converters, namely, thyristors. The variable PH which can take on the values of one through six inclusive is indicative of which cell pair which is to be fired next as, shown in the table below.

| PH | ON CELLS |
|---|---|
| 1 | 6 and 1 |
| 2 | 1 and 2 |
| 3 | 2 and 3 |
| 4 | 3 and 4 |
| 5 | 4 and 5 |
| 6 | 5 and 6 |

The cells in the bridge of the converters 1 and 3 are numbered, as shown below, in the order in which they are fired

| 1 | 3 | 5 |
| 4 | 6 | 2 |

The A phase is connected between cell 1 and 4, the B phase is connected between cells 3 and 6 and the C phase is connected between cells 5 and 2. Each variable PH has a duration of 60° and each cell is fired with a 120° high frequency pulse train.

The current count $\theta_s$ of the time counter located in the source phase-locked loop 67 is subtracted from the summing junction 68 and the resultant amount loaded into down counter 69. When down counter 69 reaches zero a signal is sent to the cell firing block 75 which fires the appropriate thyristor pair in phase controlled rectifier 1 in the master channel and sends a signal to increment the variabled PH in block 73. To assure a proper load balance between the master and slave channels a separate current regulator comprising elements 53', 55', 57', 59', 60', 61', 68', 69', 71', 73', 75' with the prime elements being configured and functioning the same as their previously described counterparts except that the current feedback signal $I_{SFB}$ to summing junction 53' is from the slave channel phase controlled rectifier, a 30° offset in the firing angle is introduced at summing junction 68' and the cell firing signals to fire the next pair of thyristor from cell firing block 75' is coupled to the slave channel phase controlled rectifier 1'.

The motor current to flux angle generator 77 in the lower control loop receives a torque command T* and provides a desired angle between motor current and motor flux angle. The motor current/flux angle is modified by multiplier 49 dependent on the flux error signal from gain block 41. The resulting motor current to flux angle is converted to an equivalent firing angle $\alpha$ in motor current/flux angle to alpha firing angle translator 79. The firing angle $\alpha$ is added in summar 81 to an offset determined from a look up table 83 which contains six offsets, one for each variable PH value indicative of the next cell pair to be fired. The variable PH is obtained from a counter 84 which is incremented each time inverter 2 is fired. The output of summer 81 is the uncorrected time to fire array, which corresponds to the time in degrees to fire the next pair of load side cells in the autosequentially commutated inverter 2 in the main channel.

Figure 1D:
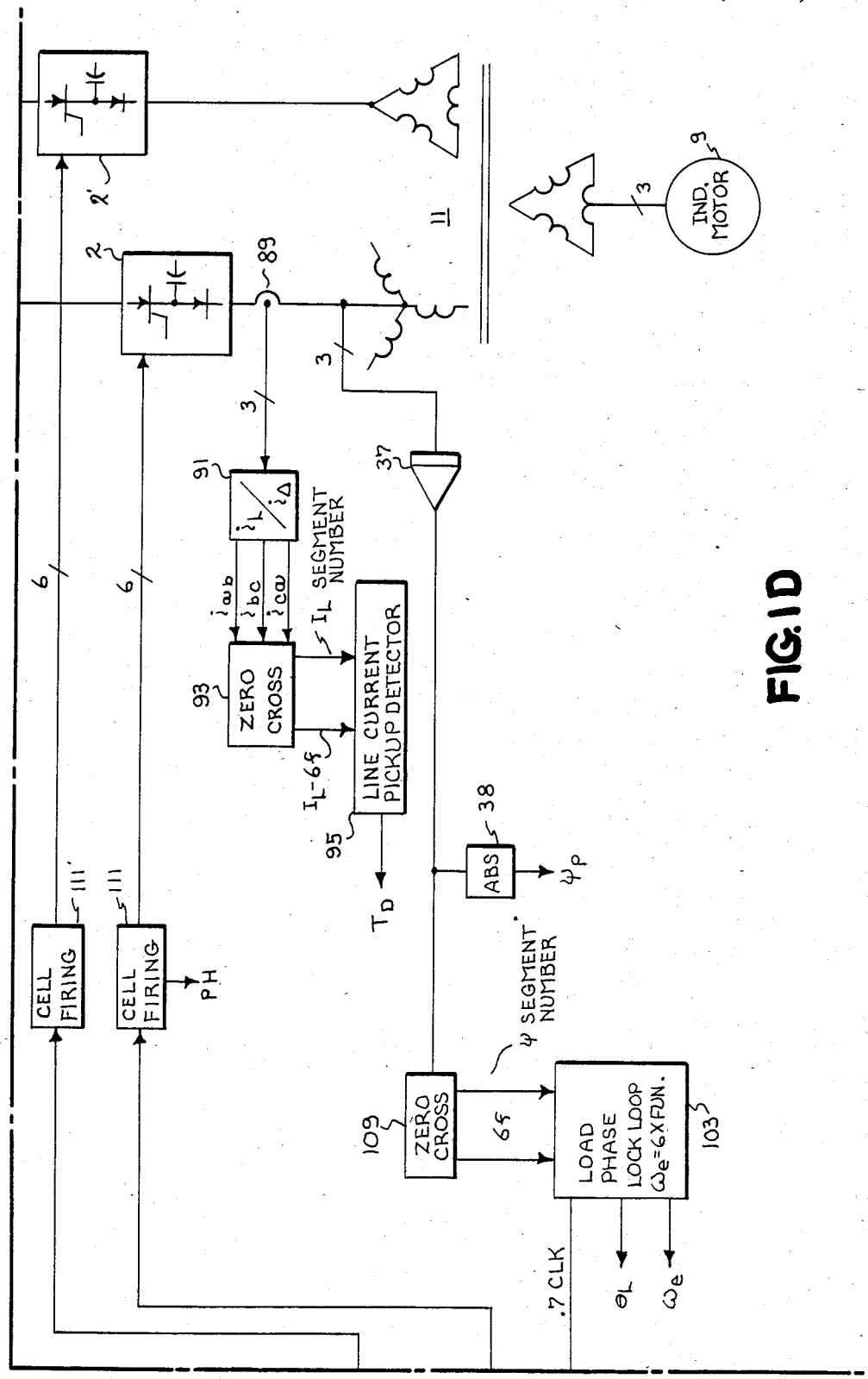

In summer 87 a delay angle in degrees is subtracted from the uncorrected time to fire array to compensate for the delay in line current pick up when the thyristor is fired due to the controlled current commutating circuit. The delay angle is determined by measuring the three line currents $i_a$, $i_b$, $i_c$ from the master channel inverter using current sensors 89. The difference currents $i_{ab}$, $i_{bc}$, $i_{ca}$ are next determined in a line to delta transformation block 91. A zero crossing detector 93 generates a digital signal when a zero crossing of the difference currents occurs and a three bit segment number indicative of the difference current having the zero crossing. These two sets of signals from the zero crossing detector are provided to a line current pick up detector 95 which determines which thyristor firing is associated with the last zero crossing and the time of the current pick up. The difference between the actual current zero crossing and the intended zero crossing is determined in summer 97. This difference is input to an integrator 99 and the output of the integrator is clamped in limiter circuit 101 with lower and upper limits of zero and 120°, respectively. The time to fire signal from summer 87 is reduced by the current count of a phase-locked loop 103 in summer 105, to determine the time to go. The time to go is loaded into a down counter 107 which is clocked by a clock signal from the phase-locked loop 103. When the down counter 107 times out the cell firing block 111 fires the next pair of cells in inverter 2 in the master channel. The integrator 37, zero crossing detector 109, the cell firing circuit 111 and the down counter 107 operate in the same manner as the corresponding firing circuitry described in the upper control loop. To determine the firing times for the inverter 2' in the slave channel, the time to go from summer 105 is summed in summer 110 with a 30° signal to fire the slave channel inverter 30 electrical degrees after the master channel inverter. If the output transformer 11 is connected as shown in FIG. 1D, the PH in the slave channel is one count ahead of the master channel. If the output of transformer 11 is connected with the delta secondary connected to the master channel and the wye secondary connected to the slave channel, then PH in the slave channel lags the PH value in the master channel. The adjusted time to go is loaded into a down counter 107' which is clocked by the phase-locked loop 103. When the down counter 107' times out the firing block 111' fires the next pair of cells in inverter 2' in the slave channel. A more detailed explanation of the operation of the load side firing control including delay compensation is provided in the aforementioned application Ser. No. 626,999, hereby incorporated by reference.

While the two parallel converters are shown supplying a three phase motor with the wye and delta primaries of transformer 11 providing a 30° relative phase shift, it is also possible to supply a six phase motor without the 30° shift introduced by the transformer. When a six phase motor is used to output of each inverter is coupled to a different set of three phase windings.

When a fault condition such as overcurrent or shoot through occurs in one or both of the channels and is detected in block 113, a signal is provided to a switch controller 115 and to a switch controller 115' through one input of a two input OR gate 117 to switch controller 115 causing switches 60 and 60' to couple the voltage command to angle command translators 61, 61' to an inversion limit command from an inversion limit block 119 instead of their respective current regulators 59, 59'. The inversion limit command causes the firing pulses provided to the phase controlled rectifiers 1, 1' to send the phase controlled rectifiers to their inversion limit thereby providing zero current to the two inverters 2, 2'.

To assure proper commutation of the inverter 2 during light load conditions, a six pulse mode block 121 receives the output of summing junction 45 and the rotor speed feedback signal $\omega_r$ and when light load, high speed conditions exist, as determined by the speed exceeding a predetermined value and the torque being less than a predetermined value, switch 60' is switched by switch controller 115' to couple voltage command to alpha command translator 60' to the inversion limit. With just one channel operating at high speed, light load conditions, the load in the remaining inverter 2 increases keeping its commutation time less than 120° assuring stable operation.

Figure 2:
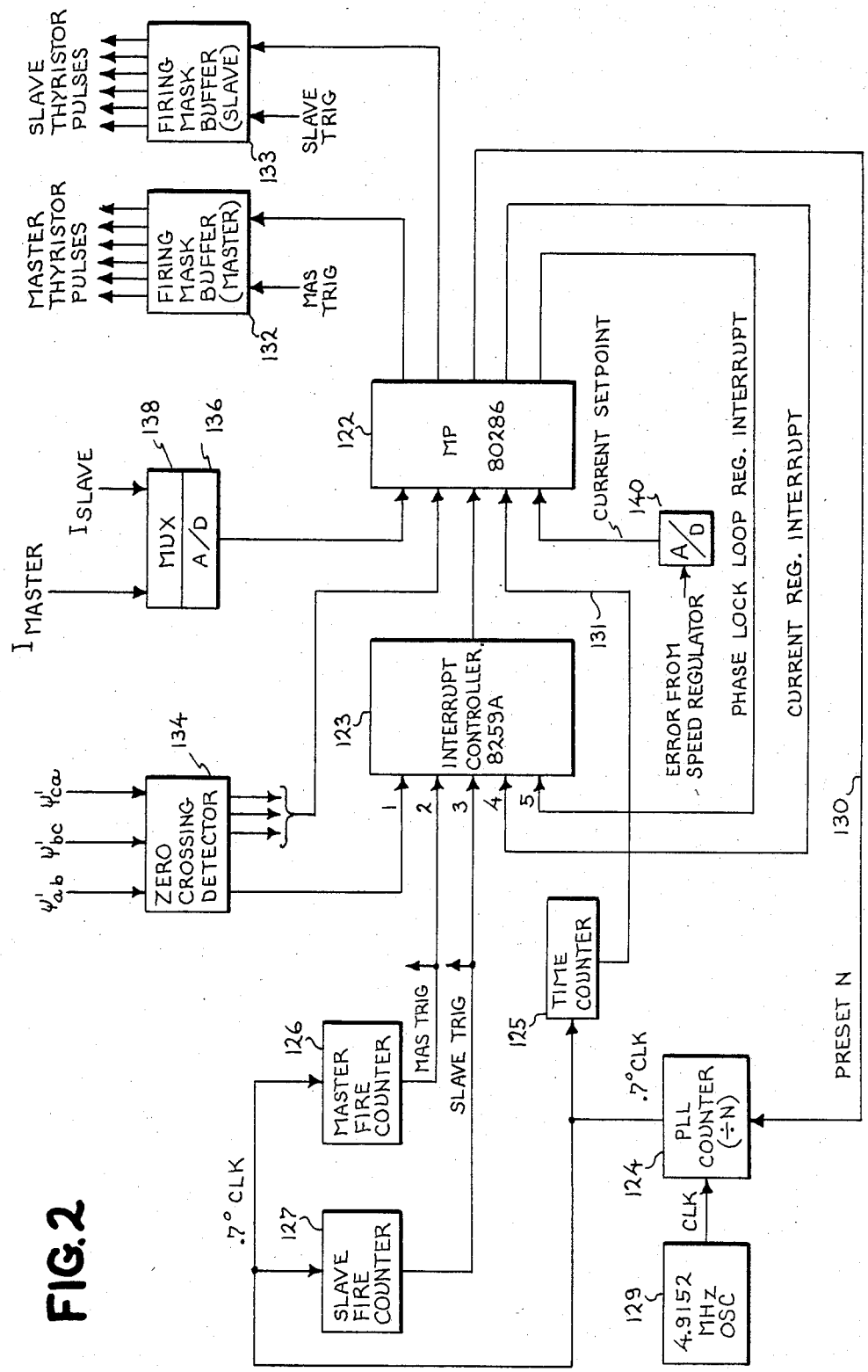
FIG. 2 is a hardware diagram of a digital embodiment of the source side converters control of the drive system of FIG. 1.

A digital implementation of the block diagram of FIG. 1 responsive to the speed error signal from summer 19 for firing the phase controlled rectifiers 1, 1', is shown in FIG. 2. Referring now to FIG. 2, there is shown an INTEL 80286 microprocessor 122 programmed in the PLM 86 language, having self contained interrupt programs under the control of an INTEL 8259A interrupt controller 123. The controller 123 generates interrupts in a well known fashion which causes the microprocessor 122 to execute some task or calculation and typically store the time to execute some future event into a down counter. When the down counter reaches zero, the counter generates another interrupt which initiates the event, after which the counter is reloaded for the time to execute the next event.

With respect to FIG. 2, a software phase-locked loop configuration is shown wherein four counters are utilized, namely a phase-locked loop counter 124, a time counter 125, a master fire counter 126 and a slave fire counter 127. In operation, a variable frequency source is created by the phase-locked loop counter 124 by dividing a 4.9152 MHz output pulse train from a clock oscillator 129 by a value N set by a signal "PRESET N" from the microprocessor 122 on a data bus 130. The output of the counter 124 is adapted to be maintained at a frequency 512 times the frequency of the individual flux waves $\Psi'_{ca}$, $\Psi'_{ab}$, $\Psi'_{bc}$, in the following manner.

The time counter 125 is initially set to 512 and decremented by 1 each clock pulse from counter 124. When counter 125 is decremented to one it resets to 512. Thus counter 125 gives a measure of phase angle relative to the flux waveforms. The count value in the time counter 125 is fed to the microprocessor 122 via data bus 131 where it is used for phase reference for firing the phase controlled rectifier thyristors, not shown, through firing mask buffers 132, 133. Synchronization is achieved by passing the pseudo flux wave forms $\Psi'_{ca}$, $\Psi'_{ab}$, $\Psi'_{bc}$ through a zero crossing detector 134 which generates a synchronizing pulse every time a flux wave passes through zero. These pulses are fed to the interrupt controller 123 which interrupts the microprocessor 122 and initiates a crossover service program. The zero crossing detector 134 also generates a three bit number indicating the relative signs of the motor flux waveforms, which number is fed to and read by the microprocessor 122 and is used to identify which zero crossing has caused the interrupt pulse. The zero crossover service program reads the value in the time counter 125 and compares it to the correct value for the particular flux wave crossing to generate a phase error between the counter 125 and the flux waves. This error is used to calculate a new "PRESET N" value which is then loaded into the phase-locked loop counter 124.

The timing of the firing of each thyristor cell in the phase controlled rectifiers 1, 1' is accomplished by means of the fire counters 126 and 127. When the master fire counter 126 is clocked down to zero a master trigger interrupt signal is generated and provided to the interrupt controller 123 and to the firing mask buffer 132 which has been loaded with the appropriate mask from microprocessor 122 for the next cell pair of the master phase controlled rectifier 1 to be fired. Similarly when the slave fire counter 127 is clocked down to zero a slave trigger interrupt signal is generated and provided to the interrupt controller 123 and to the firing mask buffer 133 which has been loaded with the appropriate mask from microprocessor 122 for the next cell pair of the slave phase controlled rectifier 1'. The microprocessor receives the DC link current from the master channel and the slave channel from an A/D converter 136 which is coupled to a multiplexer 138 which is coupled to the two signals. The microprocessor also receives the error signal from a speed regulator through an A/D converter 140. After a cell firing, the microprocessor 122 computes the time to fire the next cell in that phase controlled rectifier. This time is compared to the value in the time counter 125 which corresponds to current time. The difference in the time to go is then loaded into fire counter 126 or 127 via the data bus, which then decrements to zero causing yet another interrupt through the interrupt controller 123 which initiates a cell firing program.

Figure 3B:
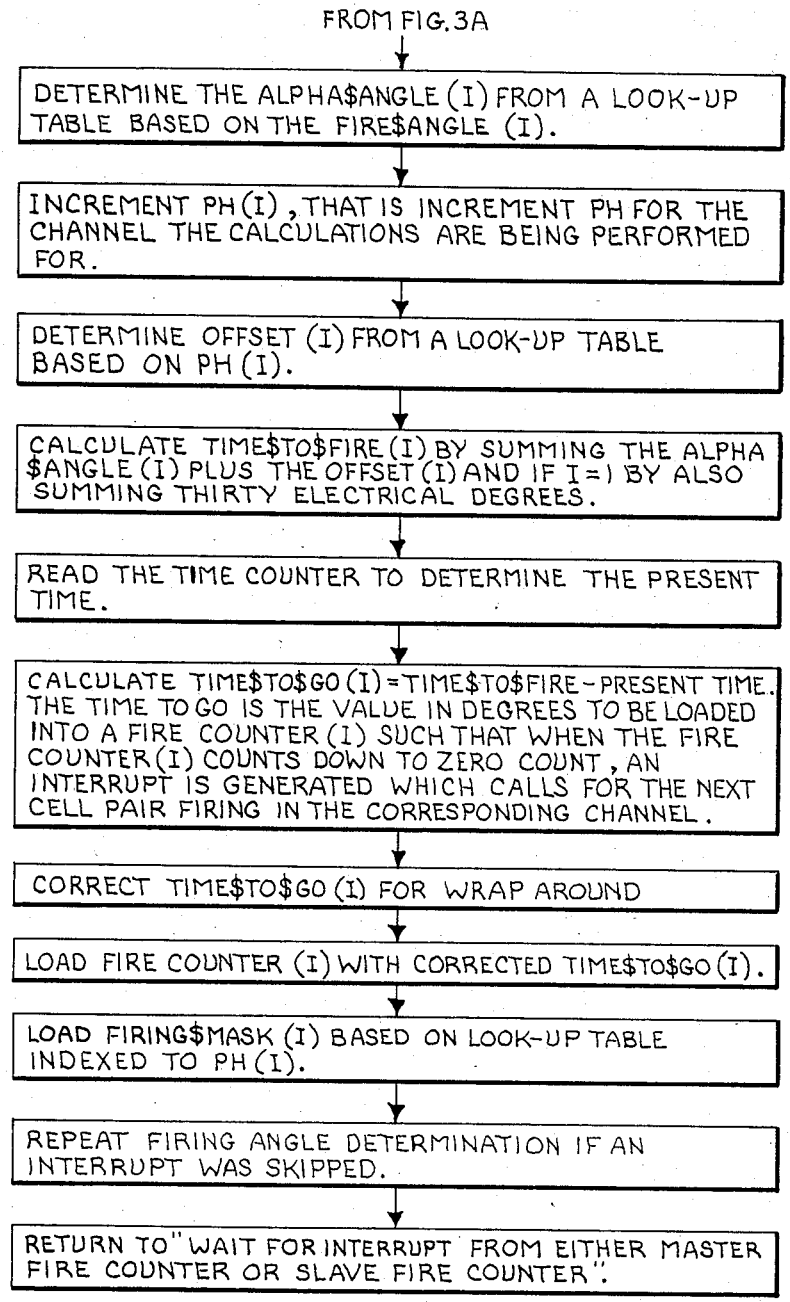
FIGS. 3A & B constitute a flow chart illustrative of the software for implementing the source side converter control with the embodiment of FIG. 2.

The software required for the embodiment illustrated in FIG. 2 is represented by the flow chart shown in FIGS. 3A & B. As shown, the routine for firing the phase-controlled rectifiers thyristors in accordance with the present invention begins by receiving an interrupt from either the master fire counter 126 or the slave fire counter 127, when either the master or slave fire counter is clocked down to zero. The desired cell pair is fired directly from hardware (firing mask buffers 132 or 133) by the interrupt. The interrupt is then identified as a master channel (I=0) interrupt which means that the master channel phase controlled rectifiers have just been fired or the interrupt is identified as a slave channel interrupt (I=1) which means that the slave channel phase controlled rectifiers have just been fired.

A check is then made to see if two successive fire counter interrupts have occurred without an intervening firing angle determination and corresponding count loaded into the fire counter. If this has occurred then the first of the two successive interrupts has been lost. The interrupt presently being serviced (the second interrupt) will continue to be serviced. When this lost interrupt condition is detected, software generates a second interrupt to replace it, which will call a regulator calculation for the lost interrupt. When the firing angle has been determined and the corresponding count loaded into the fire counter, the lost interrupt has been serviced.

The DC link current in the channel from which the last interrupt was received is determined and compared with a predetermined value. If the current is greater then the predetermined value a retard angle for the inversion limit of the phase controlled rectifier is calculated. The FIRE$ANGLE(I) is then set to equal the retard angle. The regard angle is dependent on the current flowing in the phase controlled rectifier and a retard angle is determined to be as close as possible to the inversion limit while still assuring proper commutation based on the instantaneous current and load impedance. If the DC current reduces to zero, any predetermined call for a inversion limit is removed. If the slave channel is currently being processed and the speed is greater than a predetermined amount and the torque is less than a predetermined amount, then FIRE$ANGLE(I)=RETARD$ANGLE(I).

If a fault causing overcurrent has not occurred and the slave channel is not being shut down due to high speed and light load to increase the current in the remaining channel to decrease its commutation time, then the firing angle has to be calculated. The output of the speed regulator (not shown) which is a torque command, is coupled to the A/D converter 140 and converted to a current command. The current command is compared to a current feedback signal and the resultant error signal is input to a proportional plus integral regulator routine which determines the FIRE$ANGLE(I). FIRE$ANGLE(I) is translated to an alpha firing angle. An alpha firing angle is defined as an angle measured with reference to a particular reference point, with a firing angle of zero corresponding to the condition when each thyristor in the circuit is fired at the instant its anode voltage first becomes positive in each cycle assuming no commutation circuit. Under this condition the converter operates in exactly the same manner as if it was an uncontrolled rectifier circuit.

The counter which selects the next pair of load cells to be fired is incremented so that the variable NEW$PH(I) equals PH(I)+1. From a look-up table a variable OFFSET(I) corresponding to the current value of the variable PH(I) is determined and the TIME$TO$FIRE(I) is calculated as TIME$TO$FIRE=ALPHA$ANG(I)+OFFSET(I). The time counter is read to determine the PRESENT$TIME(I). The TIME$TO$GO is then calculated as TIME$TO$GO=TIME$TO$FIRE−PRESENT$TIME(I). The TIME$TO$GO is the value in degrees to be loaded into a down counter, such that when the down counter clocks down to zero count, a pulse is generated which fires the next pair of cells and calls for the next cell firing calculation. The TIME$TO$GO is corrected for numeric wraparound since the allowable value of the time counter is zero to 512 counts.

The FIRE$COUNTER(I) is loaded with the TIME$TO$GO. The variable FIRING$MASK(I) is set equal to the appropriate pattern from a look-up table based on PH(I) and loaded into the firing mask buffer.

The FIRE$COUNTER(I) is decremented by one each 0.7 degree clock pulse. At zero count the on thyristors in the FIRING$MASK latch are fired and a new firing counter interrupt generated.

It will be noted from the flowchart that when a master channel firing occurs, the master regulator is called. That is, when the master channel phase controlled rectifier fires, the determination of the next firing of the master channel phase controlled rectifier is made. Similarly when the slave channel firing interrupt occurs the slave regulator is called. This interrupt sequence eliminates coupling between regulators (a master channel firing is not followed by a determination of the firing time of the slave channel). The actual thyristor firings are performed by hardware when the respective fire counter times out, avoiding a possible software delay in running a software routine to fire the thyristor when the fire counters time out. A very short interrupt program containing only a few statements is generated at the same time as the firing, only to inform the current regulator program which determines the firing angles of the thyristors, which channel has fired.

Figure 4:
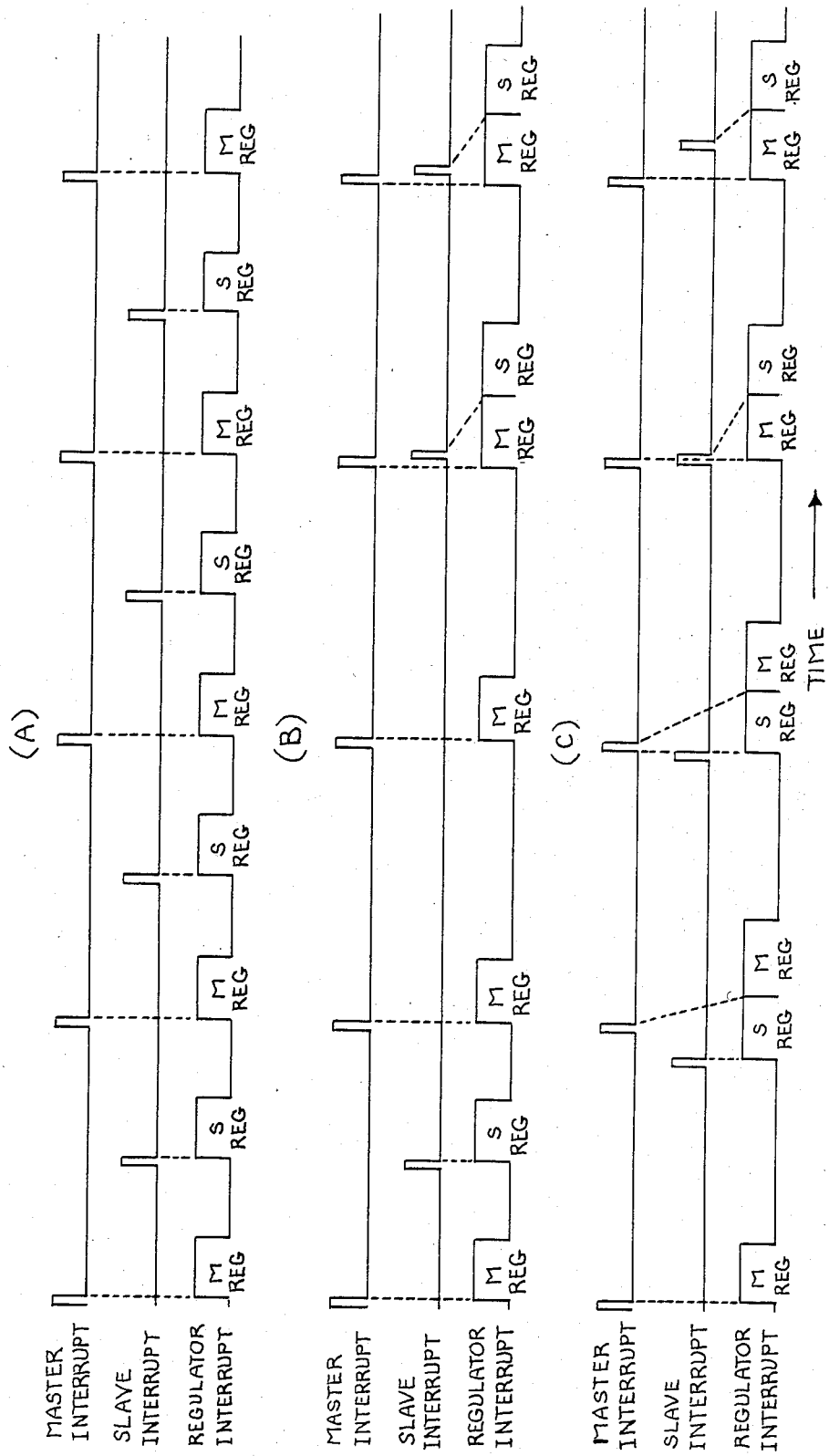
FIGS. 4A-C are waveform diagrams helpful in explaining the operation of the present invention.

A three interrupt structure of the present invention is shown in FIG. 4A. A very short high priority interrupt, which occurs when a master source converter thyristor fires, calls a longer, low priority regulator interrupt informing the regulator that a master source converter thyristor has just been fired. The regulator determines the count to be loaded into the master fire counter and loads the next firing mask into a hardware latch or buffer so that when the master fire counter times out the next master thyristor pair is fired directly out of hardware. Similarly, a short high priority interrupt which occurs when a slave source converter thyristor fires, calls a longer low priority regulator interrupt informing the regulator that a slave source converter thyristor has just been fired. The regulator determines the count to be loaded into the slave fire counter and loads the next firing mask into a hardware latch so that when the slave firing counter times out the next slave thyristor pair is fired directly out of hardware.

FIG. 4A shows normal steady state operation when the master and slave firings are 30° displaced. FIG. 4B shows the slave channel suddenly being called to the retard limit as might occur if the slave channel is shutting down due to the detection of a fault or during high speed, light load operation to decrease the commutation time in the master channel. Note that two master channel calculations occur in succession because the master channel is still firing advanced but the slave channel has suddenly been retarded approximately 120° (based on retard angle calculation). When the slave channel does start firing again there is an interrupt interference such that the slave regulator calculation must wait until the master regulator is completed.

FIG. 4C illustrates the master regulator slowly advancing ahead of the slave regulator as might occur when the master channel is coming out of the inversion limit but due to a limit on the rate of current change permitted in the control does so gradually. With the present interrupt structure, one regulator can essentially slide through the other without causing any current disturbance in either channel.

In order to more fully understand the operation of the microprocessor 122 as it relates to control of the phase controlled rectifiers 1,1′, the interrupt programs for this microprocessor will be briefly considered. Although some redundancy will result in view of the proceeding description, in their descending order of priority, the programs consist of: (1) the flux crossover service program, (2) the master fire counter service program, (3) the slave fire service program, (4) the regulator interrupt program, and (5) the phase-locked loop correction program.

The flux crossover interrupt is generated at every zero crossing of the reconstructed flux waves that occur six times per cycle of the line frequency and from which are generated the synchronizing signals for the software phase-locked loop shown in FIG. 2. The crossover interrupt program, moreover, reads the time counter 125 which is clocked from the phase-locked loop counter 124. As already indicated, the clock rate is 512 pulses per fundamental or line frequency. Thus the fundamental frequency period is divided by 512 giving the time counter an angle resolution of 360° divided by 512, which is equal to 0.703° of fundamental frequency. The flux crossover program then generates an interrupt every sixth flux wave crossover calling for the phase-locked loop correction interrupt program. The phase-locked loop correction program determines the angular error between the synchronizing crossover interrupt pulses outputed from the zero crossing detector 134 and the actual corrected time counter reading from counter 125 whereupon a new ÷N is loaded into the PLL counter 124 and which operates to nullify this error.

The second highest priority is the master fire counter service interrupt program which is initiated every time the master fire counter 126 times out. The master fire counter service interrupt generates an interrupt to initiate the regulator interrupt program to determine the count to be loaded into the master fire counter.

The third highest priority interrupt program is the slave fire counter service program which is initiated every time slave fire counter 127 times out. The slave fire counter service program generates an interrupt to initiate the regulator interrupt program to determine the count to be loaded into the slave counter.

The fourth highest priority is the regulator interrupt program which determines the mode of operation and regulator thyristor firing angle determination function and accordingly calls the appropriate algorithms.

The control of the firing of the master load side converter 2 is accomplished in the same manner as described in copending application Ser. No. 626,999 entitled "Phase-Locked Loop Control of an Induction Motor Drive". The slave load side converter is fired thirty electrical degrees after the master load converter using the firing angles determined for the master load converter.

The fifth highest priority interrupt program is the phase-locked loop correction interrupt program and is called by the flux crossover interrupt program every sixth flux wave crossover. A phase-locked loop correction interrupt program calculates the value of the divider (÷N) phase-locked loop counter 104 to maintain synchronism between the pulse output of the counter and the zero crossing of the flux waves.

The two independent parallel AC to DC converters controlled according to the present invention, while shown in a preferred embodiment supplying two six pulse parallel DC to AC inverters which in turn supply an induction motor, can be used to supply any DC load such as a DC motor. When used to supply a DC motor each AC to DC converter would require half the power rating of the motor.

The foregoing describes a microcomputer implemented 12 pulse DC motor drive that allows completely arbitrary firing angles for two parallel channels without any interference of the current regulator programs run by a single microprocessor. Further, a microcomputer implemented 12 pulse AC motor drive has been described using a single microprocessor for the firing angle determination of both source converters without creating severe restrictions on the execution time of the firing angle regulation.

While the invention has been particularly shown and described with reference to a preferred embodiment thereof, it will be understood by those skilled in the art that various changes in form and details may be made therein without departing from the spirit and scope of the invention.

What is claimed is:

1. A control for independent parallel first and second AC to DC converters having controlled switches coupled to a DC load, said control comprising:

first fire counter means for receiving the time to fire the next controlled switch in the first AC to DC converter;

second fire counter means for receiving the time to fire the next controlled switch in the second AC to DC converter;

first buffer means responsive to said first fire counter means timing out for firing the next controlled switch in the first AC to DC converter;

second buffer means responsive to said second fire counter means timing out to fire the next controlled swith in the second AC to DC converter;

means for generating a current setpoint representing the desired level of current output from said converters;

means for providing a first interrupt signal at the time of firing a switch of said first AC to DC converter;

means for providing a second interrupt signal at the time of firing a switch of said second AC to DC converter; and, current regulator means responsive to said current setpoint and said first interrupt signal for determining and loading the time to go to fire the next controllable switch into said first fire counter means and responsive to said current setpoint and said second interrupt signal for determining and loading the time to go to fire the next controllable switch into said second firing counter means, said current regulator means comprising a single microcomputer.

2. The control of claim 1 further comprising means for providing a representation of the integral of an AC line voltage coupled to one of said AC to DC converters, means to detect zero crossings of said representation to provide a pulse signal at a predetermined multiple of the AC line frequency and phase-locked loop counter means synchronized to said pulse signal, said phase-locked loop counter providing a predetermined number of counts per AC line frequency period, said phase-locked loop counter means used to clock said first and second fire counter means.

3. The control of claim 1 wherein said current regulator means comprises means for determining when fault conditions occur, and means responsive to a fault condition for retarding the firing time of said first and second AC to DC converters to reduce the current output of AC to DC converters to zero.

4. The control of claim 1 wherein said DC load includes an electric motor and wherein said current regulator means comprises means for determining when motor speed is above a predetermined value and motor torque is below a predetermined value and means for retarding the firing time of one of said AC to DC converters during high speed, low torque conditions.

5. A method of controlling independent parallel first and second AC to DC converters including controllable switches supplying a DC load, said method comprising the steps of:

generating a current setpoint representing the desired load of current output from said first and second converters;

generating a first interrupt signal at the time a controllable switch in said first AC to DC converter is fired;

determining in a microcomputer, as a function of said current setpoint and at the time of the first interrupt signal, a time to be loaded into a first fire counter for firing the next controllable switch in the first AC to DC converter;

loading a first fire counter with the time determined for firing the first AC to DC converter in the microcomputer;

generating a second interrupt signal at the time a controllable switch in said second AC to DC converter is fired;

determining in the same microcomputer, as a function of said current setpoint and at the time of the second interrupt signal, the time to be loaded into a second fire counter for firing the next controllable switch in the second AC to DC converter;

loading a second fire counter with the time determined for firing the second AC to DC converter in the microcomputer;

firing the next controllable switch in the first AC to DC converter, independent from the microcomputer, when the first fire counter times out; and, firing the next controllable switch in the second AC to DC converter, independent of the microcomputer, when the second fire counter times out.

6. The method of claim 5, wherein the steps of determining in a microcomputer further comprise the steps of determining if a fault condition has occurred, and setting the firing angle of the first AC to DC converter to an inversion limit to reduce the first AC to DC converter current output to substantially zero upon the determination of a fault condition.

7. The method of claim 6, wherein the steps of determining in the same microcomputer further comprise the steps of determining if a fault condition has occurred, and setting the firing time of the second AC to DC converter to an inversion limit to reduce the second AC to DC converter current output to substantially zero upon the determination of a fault condition.

8. The method of claim 5, wherein said DC load includes a motor and wherein the steps of determining in a microcomputer further comprise the steps of determining if motor speed exceeds a predetermined value, determining if motor torque is less than a predetermined value, and setting the firing time of the first AC to DC converter to an inversion limit to reduce the first AC to DC converter current output to substantially zero upon the determination of high speed, low current condition.

9. The method of claim 5 wherein the steps of determining in a microcomputer further comprise the steps of determining if two successive interrupt signals have been generated without generating an intervening firing time determination and corresponding time loaded into an appropriate one of the fire counters, and determining the time to be loaded into an appropriate one of the fire counters if an interrupt was skipped after a time is loaded into the first fire counter for the last received interrupt.

10. The method of claim 5 wherein the steps of determining in the same microcomputer further comprise the steps of determining if two successive interrupt signals have been generated without an intervening firing time determination and corresponding time loaded into an appropriate one of the fire counters, and determining the time to be loaded into an appropriate one of the fire counters if an interrupt was skipped after a time is loaded into the second fire counter for the last received interrupt.

* * * * *